United States Patent
Spath et al.

(10) Patent No.: US 11,680,613 B2
(45) Date of Patent: Jun. 20, 2023

(54) METHOD FOR ADAPTING A BITING POINT OF A HYDRAULICALLY ACTUATED HYBRID DISENGAGING CLUTCH

(71) Applicant: ZF Friedrichshafen AG, Friedrichshafen (DE)

(72) Inventors: Lukas Spath, Schonungen (DE); Robert Weissenrieder, Knetzgau (DE); Markus Terwart, Thundorf (DE); Moghtader Salehan, Schweinfurt (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/852,529

(22) Filed: Jun. 29, 2022

(65) Prior Publication Data

US 2023/0048509 A1 Feb. 16, 2023

(30) Foreign Application Priority Data

Jun. 30, 2021 (DE) .......................... 102021206808.1

(51) Int. Cl.
| | | |
|---|---|---|
| *F16D 48/08* | (2006.01) | |
| *B60W 10/02* | (2006.01) | |
| *B60W 20/40* | (2016.01) | |

(52) U.S. Cl.
CPC ............ *F16D 48/08* (2013.01); *B60W 10/02* (2013.01); *B60W 20/40* (2013.01); *F16D 2500/1066* (2013.01); *F16D 2500/10412* (2013.01)

(58) Field of Classification Search
CPC .......... F16D 48/08; F16D 2500/10412; F16D 2500/1066; B60W 10/02; B60W 20/40
See application file for complete search history.

(56) References Cited

U.S. PATENT DOCUMENTS

| 8,260,510 B2 * | 9/2012 | Otsubo ............... F16H 61/0437 |
| | | 701/51 |
| 9,233,684 B2 * | 1/2016 | Park ...................... B60W 10/02 |
| | (Continued) | |

FOREIGN PATENT DOCUMENTS

| DE | 102010003922 A1 | 10/2011 |
| DE | 102012102276 A1 | 9/2013 |
| | (Continued) | |

OTHER PUBLICATIONS

German Search Report DE 10 2021 206 808.1, dated Mar. 18, 2022. (12 pages).

*Primary Examiner* — Tinh Dang
(74) *Attorney, Agent, or Firm* — Dority & Manning, P.A.

(57) ABSTRACT

A method for adapting a biting point pressure of a hydraulically actuated hybrid disengaging clutch arranged in a hybrid drive train of a motor vehicle between an internal combustion engine and an electric machine includes step by step implementation during driving of the motor vehicle via a plurality of selected engagement operations of the hybrid disengaging clutch with a manipulation of a rapid filling routine. Proceeding from an initially stored biting point pressure, a setting pressure, which is reduced relative to a subsequent rapid filling routine, is incrementally increased step by step. An actual value, which is set in each case for a test parameter, is detected until the actual value corresponds to a setpoint value. A change in the transmission of torque of the hybrid disengaging clutch is derivable via the actual value.

11 Claims, 1 Drawing Sheet

(56) References Cited

U.S. PATENT DOCUMENTS

| | | | | |
|---|---|---|---|---|
| 10,407,055 B2* | 9/2019 | Kim | ...................... | B60W 10/08 |
| 11,209,054 B1* | 12/2021 | Zhang | ................... | F16D 48/066 |
| 11,505,057 B2* | 11/2022 | Matsubara | ............ | B60W 10/02 |
| 2017/0166196 A1* | 6/2017 | Park | ...................... | B60W 10/02 |
| 2018/0162378 A1* | 6/2018 | Kim | ...................... | B60W 10/02 |

FOREIGN PATENT DOCUMENTS

| | | |
|---|---|---|
| DE | 102012224278 A1 | 3/2014 |
| DE | 102016215855 A1 | 3/2017 |
| DE | 102016215787 A1 | 3/2018 |
| DE | 102016219376 A1 | 4/2018 |
| DE | 102018215848 A1 | 3/2020 |

* cited by examiner

METHOD FOR ADAPTING A BITING POINT OF A HYDRAULICALLY ACTUATED HYBRID DISENGAGING CLUTCH

CROSS-REFERENCE TO RELATED APPLICATION

The present application is related and claims priority to 102021206808.1 filed in the German Patent Office on Jun. 30, 2021, which is incorporated by reference in its entirety for all purposes.

FIELD OF THE INVENTION

The invention relates generally to a method, by way of which the biting point of a hydraulically actuated hybrid disengaging clutch in a hybrid drive train of a motor vehicle is adapted repeatedly.

BACKGROUND

It is a common feature of the different hybrid drive trains which are known from the prior art that the hybrid drive trains have an internal combustion engine, an electric machine, a transmission and at least one disengaging clutch. A disengaging clutch is arranged in a functionally active manner here between the internal combustion engine and the electric machine and/or the internal combustion engine and the transmission.

In one typical embodiment of a parallel hybrid drive, the electric machine is arranged between the internal combustion engine and the transmission, a disengaging clutch (called a hybrid disengaging clutch here) being arranged between the internal combustion engine and the electric machine.

In the open state of the hybrid disengaging clutch, the output shaft of the internal combustion engine is decoupled in a functionally active manner from the input shaft of the electric motor. In the closed state of the hybrid disengaging clutch, the output shaft of the internal combustion engine is coupled in a functionally active manner to the input shaft of the electric motor.

Here, the motor vehicle is operated in the "electric driving" or "recuperation" operating modes without the high drag torque of the internal combustion engine, by the hybrid disengaging clutch being open. The power output of the electric machine can be selected independently of the internal combustion engine. In the closed state of the hybrid disengaging clutch, the internal combustion engine and the electric machine are connected at the same time to the transmission, whereby the torques which are generated are added together.

An important characteristic variable of a clutch, and thus also of a hydraulically actuated hybrid disengaging clutch, is the biting point, also called the coupling point or touch point. The biting point is understood to mean that point at which the clutch just comes into contact, but no appreciable torque is yet transmitted. The clutch disks or clutch plates are set against one another under the action of a setting pressure on the clutch at the level of a biting point pressure, in such a way that the clutch is closed by way of the following increase in the setting pressure which acts, and can immediately transmit a torque.

The closure of a hydraulically actuated clutch takes place during an engagement operation via the displacement of a cylinder piston, connected to the clutch, in a hydraulic cylinder, by the locking chamber of the hydraulic cylinder being filled with a fluid under a filling pressure. In order to set a desired setting pressure on the clutch, a filling pressure which correlates with the desired setting pressure is applied, the setting pressure having been set after a minimum filling time and being maintained. As an alternative, the locking chamber might also be filled over a predefined filling duration with a filling pressure which is higher than a filling pressure which correlates with the setting pressure, and then be sealed with respect to the hydraulic pump.

In order to keep the engagement operation as brief as possible, that is to say the time between the coupling intention and the closure of the clutch, the clutch is moved into a biting point position in a rapid filling routine, including a rapid filling phase and a filling equalization phase, that is to say the piston is displaced into a position, in which the clutch is situated at the biting point and from which only a very small displacement travel is still necessary until the clutch disks or clutch plates are pressed completely against one another, whereby the clutch is closed. Here, a high rapid filling pressure pulse is first of all output to the locking chamber in the rapid filling phase for a rapid filling duration, whereupon the cylinder piston is set rapidly in movement, in a manner which is delayed slightly. Before the cylinder piston arrives in the biting point position, the filling pressure is lowered at the start of the filling equalization phase to a predefined level which leads to a setting pressure which acts on the clutch and corresponds to a previously determined biting point pressure which can be an initial or adapted biting point pressure. The cylinder piston is moved further in a slowed manner until, after an equalization duration, the cylinder piston has arrived at the biting point position, where the cylinder piston remains until a next pressure increase, by way of which the clutch is then closed. The level of the lowered filling pressure is in practice somewhat higher than the setting pressure, on the sole ground that the hydraulic system cannot be one hundred percent (100%) tight. To this effect, a setting pressure which correlates with the filling pressure is set on the disengaging clutch.

The setting pressure which is relevant for the biting point position of the piston and/or the setting of the biting point of the clutch is called a biting point pressure.

Setting of the biting point and therefore the biting point pressure which is as precise as possible is required, in order to set an optimum friction pressure on the disengaging clutch. The setting of a setting pressure which is less or greater than the biting point pressure leads, inter alia, to an excessively low or an excessively high breakaway gradient of the internal combustion engine, for which reason the biting point pressure is an essential characteristic variable for a performant actuation of the disengaging clutch.

The biting point is merely approximately identical for identical clutches, that is to say clutches of the same type and same dimensions, and differs specifically for the individual clutches on account of component and assembly tolerances, for example, of the clutch components, the hydraulic cylinders, the pumps, the hydraulic lines and the valves. Therefore, a specific biting point pressure has to be determined and set separately and precisely for each individual clutch. The determination of a specific biting point pressure is initially carried out, for example, at the end of the transmission production, what is known as the EOL. The initial biting point pressure is then stored in the memory of a control unit which is assigned to the drive train.

Despite a transmission-specific and clutch-specific determination of the biting point and a correspondingly individual adaptation of the actuating parameters of the clutch, such as the biting point pressure, it can happen after final assembly of a motor vehicle that problems occur during driving operation, which problems are to be ascribed to a shift of the biting point with respect to the initial biting point, which makes itself felt, for example, by way of jerks during driving operation.

DE 10 2018 215 848 A1 has disclosed a method, by way of which the biting point of a disengaging clutch is determined individually during the initial driving operation of each motor vehicle. The motor torque in the case of an open clutch is determined and stored as reference value. The clutch is then closed, a pressure which corresponds to an initial biting point being set in a rapid filling phase at an elevated rapid filling pressure. After a brief filling equalization phase, a pressure rise phase is started at a first time, an increase in the torque which is transmitted by way of the clutch occurring until the threshold torque is reached. The specific biting point for the clutch can be determined after the installation in the motor vehicle from the time duration between the initial biting point being set and the threshold torque being reached. The method described herein is designed exclusively for being carried out outside regular driving operation, and is therefore carried out during the initial vehicle operation.

The biting point for a clutch also changes, however, over the service life of a motor vehicle on account of wear, ageing, running-in behavior of components or the replacement of components, the biting point pressure as a rule becoming higher, apart from in the case of a replacement of components. The setting pressure, by way of which the clutch is set to the biting point, therefore has to be adapted repeatedly over the service life of the motor vehicle. To this end, the actual biting point pressure has to be determined. Here, the starting point is as a rule in each case the initial biting point pressure, and a pressure offset is determined, by which the initial biting point pressure is corrected, in order to obtain an adapted biting point pressure which is then used until the next adaptation when the biting point pressure is retrieved in the control unit. By way of known methods, the adaptation is carried out during the standstill of the vehicle or else while driving outside regular engagement operations, which frequently leads to the disruption of the driving comfort.

SUMMARY OF THE INVENTION

It is the object of example aspects of the invention to find a method, by way of which the biting point of a hydraulically actuated hybrid disengaging clutch is adapted during regular driving operation repeatedly during the life cycle of a motor vehicle, without the driving comfort being disrupted for the vehicle driver. The term "adaptation" describes the adaptation of system parameters to system-specific and current conditions, in order to ensure a consistent system behavior.

This object may be achieved with a method for adapting a biting point pressure of a hydraulically actuated hybrid disengaging clutch which is arranged in a hybrid drive train of a motor vehicle between an internal combustion engine and an electric machine. The method begins with the detecting of engagement operations of the hybrid disengaging clutch during the driving operation of the motor vehicle and the selecting of one of the engagement operations. In the selected engagement operation, during the rapid filling routine of a hydraulic system which actuates the hybrid disengaging clutch, including a rapid filling phase and a filling equalization phase, a setting pressure is set on the hybrid disengaging clutch, which setting pressure is reduced in comparison with a stored biting point pressure. In the case of a first adaptation, the stored biting point pressure corresponds to an initial biting point pressure. In the case of adaptations which have already been carried out, the stored biting point pressure corresponds to the adapted biting point pressure which was last determined; the stored biting point pressure does not have to be stored directly, but rather can also be calculated in each case from the stored initial biting point pressure and a stored pressure offset. After the reduced setting pressure prevails on the hybrid disengaging clutch, the setting pressure is increased by a predefined increment to an increased setting pressure, and an actual value which is set for a test parameter is sampled, from which a transmission of torque by way of the hybrid disengaging clutch can be derived directly or indirectly. The actual value for the test parameter is compared with a setpoint value which is stored for the test parameter.

Here, in the case where the actual value is greater than or equal to the setpoint value, the increased setting pressure is used as adapted biting point pressure for subsequent engagement operations which are not selected.

In the case where the actual value is smaller than the setpoint value, a next engagement operation is selected, and the increased setting pressure is used as reduced setting pressure to carry out the rapid filling phase and is set on the hybrid disengaging clutch. The above-described method steps are repeated until the actual value which is set in each case corresponds to the setpoint value.

In the case where the actual value is greater than or equal to the setpoint value, the increased setting pressure is advantageously stored as an adapted biting point pressure.

As an alternative, it is advantageous if a difference between the increased setting pressure and the initial biting point pressure is formed and is stored as a pressure offset, and the adapted biting point pressure is determined in each case from the initial biting point pressure and one of the stored pressure offsets.

The increment can be equally large for the selected coupling operations, but is increasingly smaller for the selected engagement operations which follow one another, whereby the biting point pressure can be determined in an increasingly more precise manner.

It is also advantageous if at least one further test parameter, from which a transmission of torque by way of the hybrid disengaging clutch can be derived directly or indirectly, is sampled and is compared with a setpoint value.

The test parameter or one of the further test parameters is advantageously a gradient change in a rotational speed of an electric machine which is connected to the hybrid disengaging clutch.

As an alternative, the test parameter or one of the further test parameters is a change in a torque for rotational speed regulation of an electric machine which is connected to the hybrid disengaging clutch.

In a further alternative, the test parameter or one of the further test parameters is a change in a balanced torque on an electric machine which is connected to the hybrid disengaging clutch.

In order for it to be possible for the adaptation of the biting point to be implemented in a manner which is unnoticed by the vehicle driver, the duration of the engagement operations which correspond in each case to a restarting phase of the internal combustion engine has been found to be a time which is suitable for this purpose. This time happens repeatedly over the life cycle of a motor vehicle, even multiple times during one journey if the internal combustion engine is regularly switched on in addition to the electric machine.

In order that the driving comfort for the vehicle driver is not disrupted, an engagement operation is used for implementation only when the brief retardation of the engagement operation is acceptable. For example, it might be deduced from the manner of the actuation of the accelerator pedal by way of the vehicle driver whether an immediate acceleration is required, as in the case of sporty overtaking or an evasive maneuver. An engagement operation of this type is then not included by the method.

One particular special feature of the method according to example aspects of the invention then consists in the fact that the method is not implemented within a single clutch operation, but as a rule proceeds over a plurality of clutch operations. As a rule, in a plurality of repeating method steps, the rapid filling routine, as has been explained for a regular implementation in the description of the prior art, is manipulated in each case during regular engagement operations. Sequential engagement operations without a break do not have to be used to this end, but rather merely selected engagement operations. That is to say, engagement operations of the type which the on-board computer system identifies, for example, as "sporty" are not used for this purpose, in order not to influence the intended driving behavior by way of retardations.

The method according to example aspects of the invention takes place independently of the intentions of the vehicle driver and unnoticed by him/her.

BRIEF DESCRIPTION OF THE DRAWING

In the following text, example aspects of the invention will be explained in greater detail using one exemplary embodiment on the basis of the drawing, in which.

DETAILED DESCRIPTION

Figure 1:
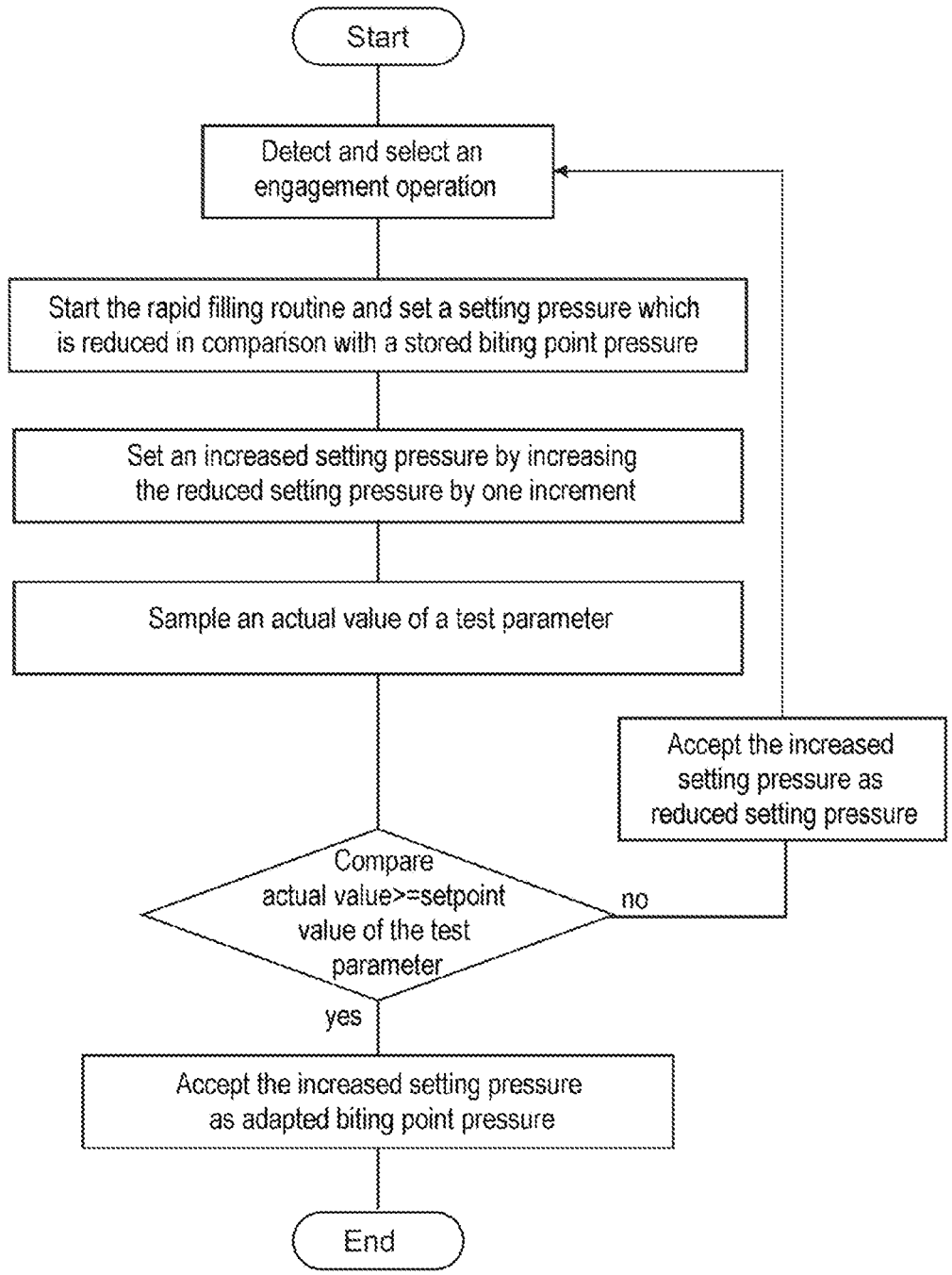
FIG. 1 shows a flow chart.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

The method as a rule takes place in a plurality of repeating method steps, for which in each case the rapid filling routine of engagement operations which take place regularly and successively, during driving of a motor vehicle, is utilized. Here, the customary rapid filling routine is in each case manipulated, and a pressure offset is determined iteratively with respect to an initial biting point pressure in the case of a first adaptation or with respect to a previously adapted biting point pressure in the case of a repeated implementation of the method (repeated adaptation). A pressure offset is in each case the difference, which changes over the service life of the vehicle, between the initial biting point pressure and an adapted biting point pressure which has to be set, in order to set the disengaging clutch as precisely as possible to the biting point. The changing biting point pressure is determined by the method and is set as an adapted biting point pressure in the case of subsequent engagement operations on the disengaging clutch.

By way of the engagement operation of a hybrid disengaging clutch, an active attachment operation of an internal combustion engine to an electric machine of a hybrid drive train of a motor vehicle takes place. The engagement operation includes a rapid filling routine with a rapid filling phase and a filling equalization phase, and a subsequent clutch phase. In a filling equalization phase which takes place regularly, a filling pressure is applied which, at the end of the filling equalization phase, loads the hybrid disengaging clutch with a setting pressure which corresponds to a previously determined biting point pressure. This can be an initial biting point pressure or a previously adapted biting point pressure.

In contrast to this, in the case of a rapid filling routine which is manipulated according to example aspects of the invention, during the filling equalization phase a setting pressure is applied to the hybrid disengaging clutch, which setting pressure is reduced with respect to an initial biting point pressure or a previously adapted biting point pressure and is approximated iteratively in directly or indirectly subsequent rapid filling routines of selected engagement operations to the initial or possibly the already previously adapted biting point pressure, as has to be applied at this time in order to set the biting point of the clutch.

In the following text, the procedure of the method (shown in FIG. 1 as a flow chart) will be explained.

In a manner which has preferably been pre-programmed at the factory, the method begins by, for example, the engagement operations being detected, from a defined odometer value of the motor vehicle or from a number of engagement operations since the last successful adaptation, and being checked automatically for suitability for use for the implementation of the method. After the determination of the suitability of an engagement operation, the latter is selected for the implementation of the method, and the rapid filling routine is carried out.

During the rapid filling phase, a rapid filling pressure is first of all applied over a rapid filling duration, and subsequently, in a filling equalization phase, the filling pressure is lowered and is maintained at least over an equalization duration, in which a setting pressure which correlates with the filling pressure has been set on the disengaging clutch. Here, the lowered filling pressure is selected in such a way that a correlating setting pressure which is set is lower than a stored biting point pressure. A biting point pressure which is determined from the stored initial biting point pressure and a stored pressure offset also applies here as stored biting point pressure.

The hybrid disengaging clutch is then applied further by a step, that is to say the lowered filling pressure is increased by an increment. After only a short waiting time, in which a setting pressure which correlates with the increased filling pressure has been set statically at the clutch, an actual value which is set for a selected test parameter is detected, from which a change in the transmission of torque by way of the hybrid disengaging clutch can be derived directly or indirectly. This can be, for example, a gradient change of the rotational speed of the electric machine, a change in the torque for rotational speed regulation of the electric machine, or a change in the balanced torque at the electric machine. The actual value which is set of the test parameter is compared with a setpoint value which is stored for the test parameter. The setpoint value correlates with beginning transmission of torque, which is not yet significant, by way of the disengaging clutch when the disengaging clutch is situated in the biting point position.

In the case of the actual value being identical to the setpoint value, it can be concluded that the increased setting pressure which correlates with the increased filling pressure corresponds to the biting point pressure. Should the determined actual value have already exceeded the setpoint value, it can be concluded that the actual biting point pressure lies within the change range of the setting pressure. In order to determine the actual biting point as precisely as possible, the magnitude of the change in the setting pressure (increment) is selected to be very small, with the result that, in further method steps, the setting pressure approaches the actual biting point iteratively from below over a large number of small steps. In the case of the setpoint value being reached by way of an actual value, the assumption is then made that the setting pressure has reached the actual biting point pressure. The smaller a magnitude of the increment, by which the setting pressure is increased in each case, the more precisely the actual biting point pressure can ultimately be determined and utilized as an adapted biting point pressure for further regular engagement operations.

If, after a first increase in the setting pressure, a beginning transmission of torque cannot yet be derived from the actual value of the parameter, which corresponds to the norm, the increased setting pressure is stored for a continuation of the method in a later method step which takes place during a later clutch operation, whereby the current clutch operation is not delayed any longer. In addition, in a manner which is assigned to this, the detected actual value of the detected parameter is stored. The current engagement operation is now concluded.

A next suitable engagement operation is selected, in the case of which the directly previously set increased setting pressure forms the starting point. This is increased by an increment in an analogous manner with respect to the previous engagement operation utilized for the method. Here, the magnitude of the increment, by which in each case the setting pressure is increased per engagement operation, can be identical, or the magnitude of the increment becomes increasingly smaller, whereby the actual biting point pressure can be determined very precisely with a comparatively small number of iteration steps. Subsequently, the actual value of the parameter is detected again, from which a change in the transmission of torque by way of the disengaging clutch can be derived directly or indirectly and can be compared with the stored setpoint value for the parameter.

Further adaptation attempts follow in each case in a subsequent engagement operation until the respective actual value for the detected parameter corresponds to the setpoint value. The increased setting pressure which is then set is adopted as the actual biting point pressure at the detection time and is stored (adapted biting point pressure). The adapted biting point pressure is then set for all subsequent engagement operations.

It goes without saying that the change of two relevant parameters can also be tracked and analyzed during the method. In this way, the value comparison of one parameter can be verified.

The method can be repeated again and again over the service life of the vehicle, the most recently adapted biting point pressure then in each case forming the starting point. It is advantageous here, instead of the respective determined biting point pressure, to store in each case the pressure offset, and to then determine the last adapted biting point pressure in each case from the initial biting point and the most recently stored pressure offset.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

The invention claimed is:

1. A method for adapting a biting point pressure of a hydraulically actuated hybrid disengaging clutch arranged in a hybrid drive train of a motor vehicle between an internal combustion engine and an electric machine, the method comprising:
  a) detecting of engagement operations of the hybrid disengaging clutch during driving operation of the motor vehicle, each of the engagement operations comprising a rapid filling routine of a hydraulic system for actuating the hybrid disengaging clutch that includes a rapid filling phase and a filling equalization phase, and selecting one of the engagement operations;
  b) implementing the rapid filling routine of the selected one of the engagement operations, a setting pressure being set on the hybrid disengaging clutch during the filling equalization phase, the setting pressure either corresponding to a reduced setting pressure relative to a stored initial biting point pressure at a first adaptation or corresponding to the reduced setting pressure relative to a most recently determined adapted biting point pressure for subsequent adaptations after the first adaptation;
  c) increasing the reduced setting pressure by a predetermined increment to an increased setting pressure, and sampling an actual value set for a test parameter via which a transmission of torque by the hybrid disengaging clutch is derivable directly or indirectly;
  d) comparing the actual value for the test parameter with a setpoint value stored for the test parameter, and using the increased setting pressure used as an adapted biting point pressure for subsequent, non-selected engagement operations when the actual value is greater than or equal to the setpoint value; and
  e) using the increased setting pressure as the reduced setting pressure for a repeated implementation of step b, and repeating steps a through d when the actual value is less than the setpoint value.

2. The method of claim 1, further comprising storing the increased setting pressure as an adapted biting point pressure when the actual value is greater than or equal to the setpoint value.

3. The method of claim 1, further comprising:
  calculating a difference between the increased setting pressure and the initial biting point pressure;
  storing the difference as a pressure offset when the actual value is greater than or equal to the setpoint value; and
  determining the adapted biting point pressure in each case from the initial biting point pressure and one of a plurality of stored pressure offsets.

4. The method of claim 1, wherein the predetermined increment is specified to be increasingly smaller for each of the selected engagement operations.

5. The method of claim 1, further comprising sampling and comparing actual values for at least one further test parameter via which the transmission of torque by the hybrid disengaging clutch is derivable directly or indirectly with a setpoint value.

6. The method of claim 5, wherein the test parameter or one of the at least one further test parameter comprises a gradient change in a rotational speed of the electric machine connected to the hybrid disengaging clutch.

7. The method of claim 5, wherein the test parameter or one of the at least one further test parameter comprises a change in a torque for rotational speed regulation of the electric machine connected to the hybrid disengaging clutch.

8. The method of claim 5, wherein the test parameter or one of the at least one further test parameter comprises a change in a balanced torque on the electric machine connected to the hybrid disengaging clutch.

9. The method of claim 1, wherein the test parameter comprises a gradient change in a rotational speed of the electric machine connected to the hybrid disengaging clutch.

10. The method of claim 1, wherein the test parameter comprises a change in a torque for rotational speed regulation of the electric machine connected to the hybrid disengaging clutch.

11. The method of claim 1, wherein the test parameter comprises a change in a balanced torque on the electric machine connected to the hybrid disengaging clutch.

* * * * *